April 6, 1926.  
E. B. SWENEY  
FLEXIBLE SHAFT COUPLING  
Filed Jan. 17, 1924  
1,579,967
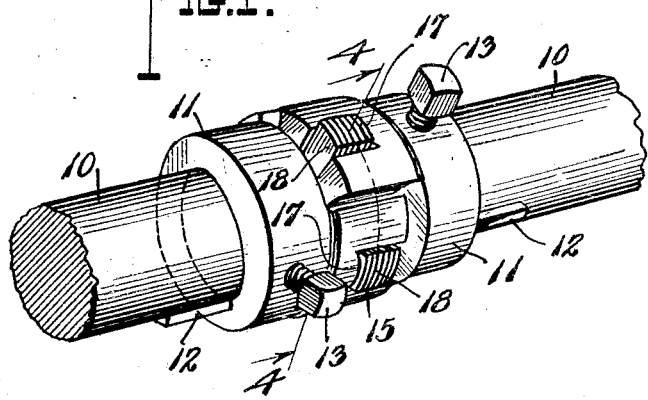
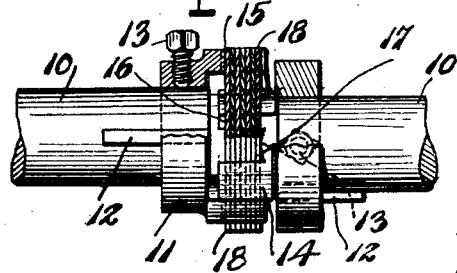
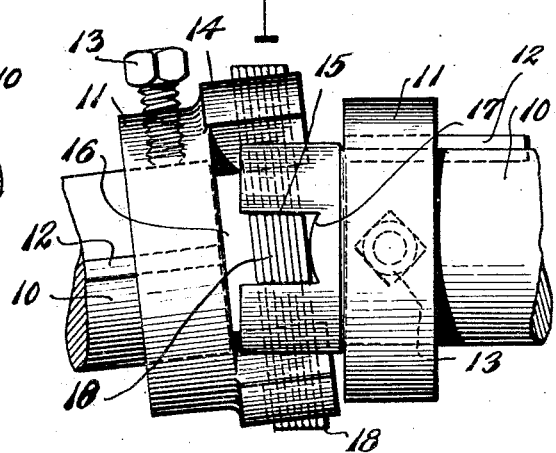
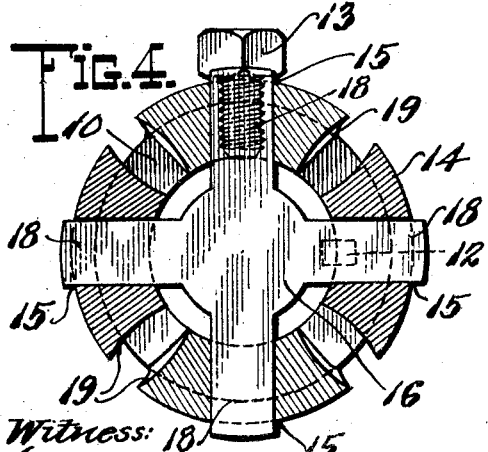
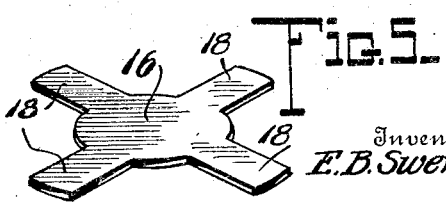
Witness:  
C.H. Wagner
Inventor  
E. B. Sweney  
By Robb, Robb & Hill  
Attorneys Patented Apr. 6, 1926.

1,579,967

UNITED STATES PATENT OFFICE.

EDWARD B. SWENEY, OF RED WING, MINNESOTA.

FLEXIBLE SHAFT COUPLING.

Application filed January 17, 1924. Serial No. 686,747.

*To all whom it may concern:*

Be it known that I, EDWARD B. SWENEY, a citizen of the United States, residing at Red Wing, in the county of Goodhue and State of Minnesota, have invented certain new and useful Improvements in Flexible Shaft Couplings, of which the following is a specification.

This invention relates to flexible shaft coupling, and particularly to a construction designed to permit the coupling of parallel shafts when out of alignment or of such coupling when the shafts are at an angle to each other.

In prior constructions such coupling could not be practically effected without a spacing of the coupling members which permitted relative end or thrust movement of the shafts and the devices did not provide for coupling the shafts either out of alignment or at an angle to each other.

The present invention has for an object to present a novel and improved construction comprising opposite coupling heads having seats in which loosely mounted laminated plates are disposed to compensate for all out of alignment conditions and provide a tight coupling between the shafts.

A further object of the invention is to present an improved construction of coupling head having axially disposed lugs provided with seats spaced from the body of the head and formed with a convex bearing face to receive engaging coupling plates loosely mounted for rocking movement upon said face.

Another object of the invention is to provide an improved construction of loosely assembled coupling plates having radiating arms or spines and seated in opposite coupling heads to move upon each other when said heads are disposed in positions out of axial alignment with each other.

Other and further objects and advantages of the invention will be hereinafter set forth and the novel features thereof defined by the appended claims.

In the drawing:

Figure 1 is a perspective of the invention applied;

Figure 2 is a side elevation with parts in section showing the coupling of shafts out of alignment;

Figure 3 is a side elevation showing the coupling of shafts at an angle to each other;

Figure 4 is a section on line 4—4 of Figure 1; and

Figure 5 is a detail perspective of one of the coupling plates.

Like numerals refer to like parts throughout the several figures of the drawing.

In the application of the invention the coupling heads and plates are adapted to be formed of any desired material or size dependent upon the shafts to be connected, and in the present disclosure the shafts 10 are each provided with coupling heads 11 of similar construction adjustably mounted thereon by means of a key 12 so as to be slid upon the shafts into engagement with each other and there secured by any desired means such as a set screw 13. These coupling heads are provided with diametrically opposite lugs 14 provided with recesses or seats 15 adapted to receive the coupling plates 16 which rest upon a convex face 17 at the base of the seat forming a rocking support for the arms or spines 18 of the plates which extend in said seats. These seats are spaced from the coupling heads 11 so that when the parts are assembled the lugs are disposed at a distance from the associated head sufficient to allow for a lateral movement when the shafts are disposed out of alignment as in Figure 3.

The arms 18 of the coupling plates are also formed of sufficient length so as to extend laterally beyond the seats in the coupling heads to permit a coupling of the shafts when out of axial alignment as in Figure 2. The coupling member is laminated and a sufficient number of plates used to substantially fill the seats in the coupling heads while the loose mounting of the plates permits a sliding movement thereof upon each other when one shaft is disposed at an angle to the other or any lateral movement occurs between the shafts.

By reference to Figure 4 is will be seen that the outer faces of the lugs 14 are slightly inclined or convex as at 19, which provides a clearance space in the movement or adjustment of the parts out of alignment permitting free lateral movement.

In the application of the invention it will be seen that the novel construction presented provides for the coupling of shafts which are out of axial alignment and also such shafts when disposed at an angle to each other as the laminated plates are adapted for a rocking movement upon the base of the seat containing the same and a coincident sliding movement upon each other thus compensating for the difference in alignment of the shafts and providing a tight coupling. The invention is applied by disposing the coupling heads upon the keys carried by the opposite shafts and bringing said heads into close contact with the plates carried thereby in position to take up any space between the shaft ends, and these heads are then secured in position upon the shafts by the set screws before described. Under the conditions of use the plates when adjusted at an agle retain a parallel position to each other with their entire surfaces in contact, thus affording the most efficient holding action between the coupling heads and transmitting the full power from one shaft to the other without creeping or slipping of the coupling members.

While the specific construction for mounting the coupling heads and of the application of the laminated plates thereto has been shown and described, the invention is not confined to such details as changes and alterations may be made therein without departing from the spirit of the invention as recited in the following claims.

Having thus described my invention, What I claim as new and desire to secure by Letters Patent is:—

1. In a flexible coupling, the combination with opposing coupling heads, of a driving connection therebetween composed of a series of plates disposed face to face in interlockin engagement with each of the heads, each plate being loosely mounted for relative movement transversely to the axis of said heads.

2. In a flexible coupling, the combination with opposing coupling heads, of a driving connection therebetween composed of a series of plates disposed face to face in interlocking engagement with the heads, each plate consisting of a plurality of sets of extensions engaging the opposing heads, whereby the driving operation is transmitted from one head to the other through the plates from one set of extensions to another set thereof.

3. In a flexible shaft coupling, opposite coupling heads provided with seats, and independently movable parallel coupling members having portions disposed in said seats with their parallel faces transverse to the coupling axis, the base of said seats being formed with a surface to permit lateral rocking movement of the outer parallel face of one member thereon.

4. In a flexible shaft coupling, the combination with opposing coupling heads each provided with opposite lugs thereon, of a driving connection therebetween composed of a series of plates disposed face to face in interlocking engagement with the lugs of the heads and held in position thereby, each plate being loosely mounted with relation to others of the series and having a set of extensions in contact with lugs upon one head and another set of extensions in contact with lugs upon an opposing head.

5. In a flexible shaft coupling, a coupling head provided with opposite lugs having seats therein, and a series of independently movable coupling plates provided with radial arms disposed in said seats, the base of said seats being formed convex to effect a rocking movement of said arms when the shafts are disposed out of alignment.

6. A coupling plate for a flexible shaft coupling comprising a flat plate having a central body and two sets of integral diametrically disposed arms at substantially a right angle to each other.

7. In a flexible shaft coupling, coupling heads, means carried thereby for securing the same to shafts to be coupled, oppositely disposed lugs carried by said heads and provided with seats spaced from the body of the head, and laminated, coupling plates, freely movable upon each other and disposed in said seats with their side faces transverse to the coupling axis.

8. In a flexible shaft coupling, coupling heads, means carried thereby for securing the same to shafts to be coupled, oppositely disposed lugs carried by said heads and provided with seats spaced from the body of the head, and laminated coupling plates freely movable upon each other and disposed in said seats with their side faces transverse to the coupling axis, the outer faces of said lugs being oppositely concaved.

In testimony whereof I affix my signature.

EDWARD B. SWENEY.